Sept. 17, 1968 S. E. TOWNSEND 3,402,263

FACSIMILE DECISION CIRCUIT

Filed Dec. 2, 1964

INVENTOR.
STEPHEN E. TOWNSEND

BY Anthony D. Cennamo
ATTORNEY

Joseph F. Rosenthal
AGENT

United States Patent Office 3,402,263
Patented Sept. 17, 1968

3,402,263

FACSIMILE DECISION CIRCUIT

Stephen E. Townsend, Rochester, N.Y., assignor to Xerox Corporation, Rochester, N.Y., a corporation of New York Filed Dec. 2, 1964, Ser. No. 415,318
4 Claims. (Cl. 178—69.5)

ABSTRACT OF THE DISCLOSURE

A circuit for converting a video signal with random transitions, i.e., changes from black to white and vice-versa, into a signal in which transitions are synchronized to a clock signal. Circuitry is utilized to decide what binary state should be assigned to each bit of the clocked signal on the basis of the random transition video signal which can often be expected to be in both states sometime during a clock period. Bistable circuitry performs the rule that if the facsimile signal was transmitted as black during the previous clock interval, the next interval will be transmitted as white if the input video siganl is white at any time during this interval, and vice-versa.

Figures 1, 2:
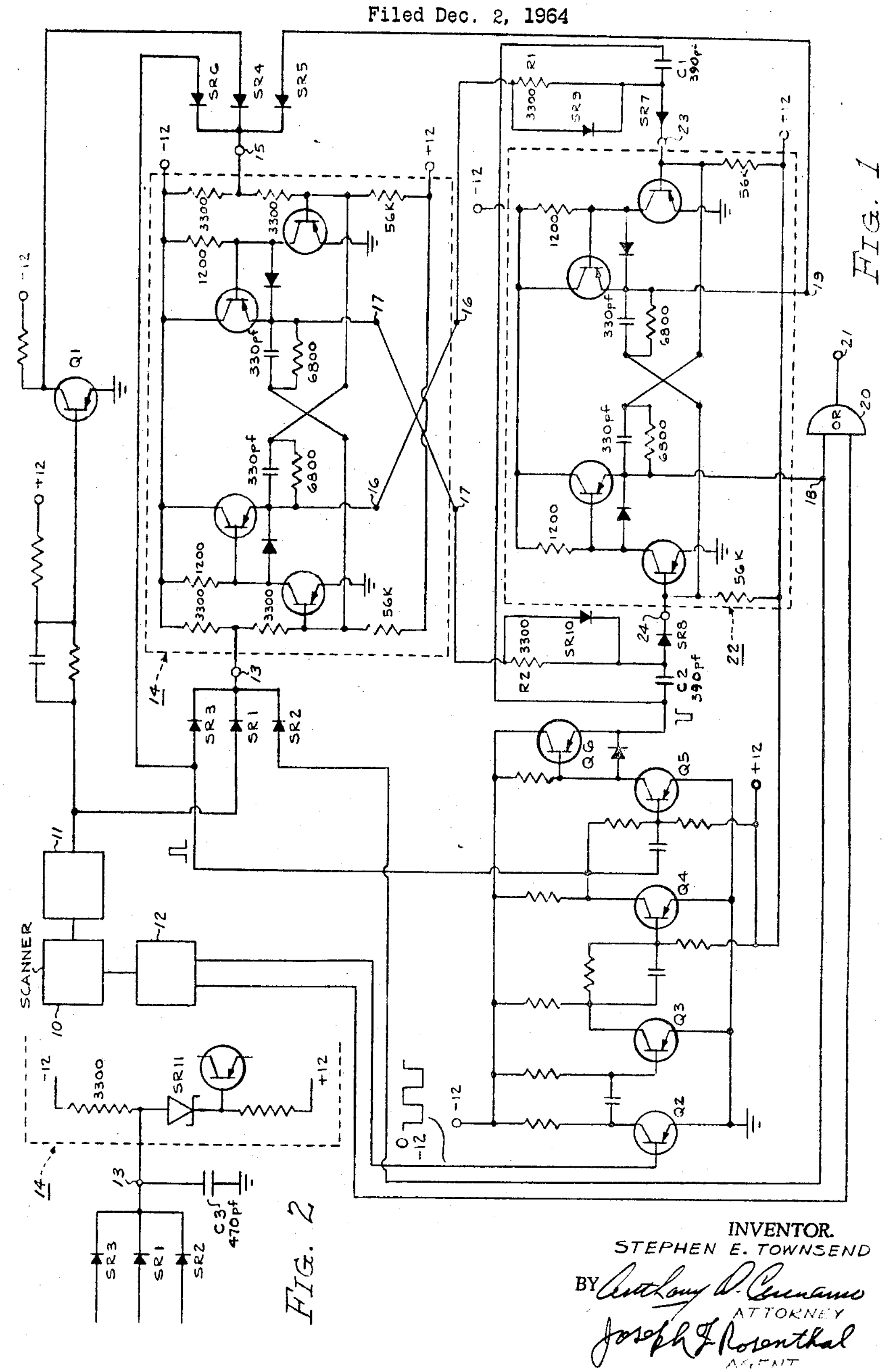

This invention relates to means and methods for making black-white decisions in a time and amplitude quantized facsimile system.

It is conventional in a facsimile system to employ a transmitter which scans an original document in some regular pattern of lines and derives an output video signal which is linearly related to the optical density of an element of the original being scanned. This signal is transmitted to a remote receiver which scans a sheet of paper in synchronism with the transmitter and converts variations in the signal to variations in optical density, thus recreating the original document. This type of facsimile system will transmit any form of document, but is particularly useful for transmitting pictures. The resolution and fidelity of the image produced at the receiver depends on the characeristics of the transmitter and receiver and also on the frequency, phase distortion, and noise characteristics of the telephone line, radio channel or other transmission link used to connect the transmitter and receiver.

The transmission link is often by far the most expensive element in a facsimile system and the one which principally limits the speed and/or quality of transmission. A second type of facsimile system minimizes these limitations by sacrificing the capability of transmitting photographs or other continuous tone originals. In this type of facsimile system, the transmitter produces a signal which is limited to one of two discrete values, representative of black or white areas on the original document. The receiver makes corresponding black marks upon receiving a black signal. With this type of system, it is possible to transmit documents at a greater rate or at a higher resolution and with fewer errors than with a system that retains continuous tone capabilities. In such a two-level system, the number of black-white transitions for a given length of scan is fixed by the frequency response of the entire system, but each individual transition can take place at a more or less arbitrary time or place, subject only to extraneous electrical noise in the system. Accordingly, the receiver can accurately reproduce the location of black-white discontinuities in the original document and produce a copy which is a geometrically accurate reproduction of the original.

A third type of facsimile system is designed to make even more efficient use of the transmission link by quantizing the transmitted facsimile signal in time as well as in amplitude. In this system, facsimile signals corresponding to black-white or white-black transitions can be sent only at discrete time intervals. Normally, the transmitter includes a clock pulse generator which produces a train of pulses and the system is designed so that facsimile signals indicative of black-white or white-black transitions are sent only at times which coincide with clock pulses. Such facsimile signals are very similar to the signals employed in computers and other digital data processing apparatus. They can be reliably transmitted at high rates through a transmission link. They can be reliably regenerated in repeater amplifiers. They can be combined, as in digital computers, with parity signals to provide positive protection against errors in transmission. They can be coded in accordance with a predetermined scheme, transmitted in coded form, and accurately recreated at a receiving location. They can be used to reliably synchronize a transmitter and receiver. All of these benefits, as well as others, flow from the fact that the facsimile signals are time quantized as well as amplitude quantized. This type of facsimile system has accordingly many advantages for high-speed, high quality or long distance transmission of black and white documents. It may also be referred to as a synchronous clocked system.

The above system also presents major problems which are the concern of this invention. In general, the transmitted facsimile signal can be considered as a sequence of uniform time intervals, or bits, during each of which the signal has a value representing either black or white. The transmitter must accordingly make an unambiguous decision as to whether each such time interval is to represent black or white. One approach to the problem lies in adapting digital computer techniques. In accordance with this approach, an amplitude quantized facsimile signal is applied to one input of an inhibited flip flop circuit. The inhibition is periodically removed by clock pulses which permit the flip flop to assume a state determined by the value of the input facsimile signal. The state of the flip flop is retained at least until the next clock pulse signal. In this way, the transmitted facsimile signal, derived from the flip flop, is determined by the value of the input to the flip flop at the instant of the preceding clock pulse. The difficulty with this system is that it generates a time quantized facsimile signal by sampling the nonquantized signal at discrete intervals. The values at the sampled intervals, however, may be quite different from the values at other times. The number of transmitted signals per second must be limited to the capacity of the transmission link being employed, but the facsimile scanner may be capable of generating many more transitions and this actually represents a desirable condition. Thus, the time quantizing process must assign a single value, black or white, to a time interval which may contain several transitions between black and white.

The instantaneous sampling procedure described above is not completely satisfactory. The nature of the problem can be seen by considering the facsimile transmission of a document containing a smalll black dot or black line on a white background or of a document containing a small white dot or line on a black background. In either case, the dot or line represents significant information which should be included in the transmitted facsimile signal, but the small dot or line could appear between clock pulses and thus be omitted from the transmitted signal. A different approach would be to determine the transmitted facsimile signal on the basis of the average input signal over a clock pulse interval, but this would be subject to many of the same drawbacks.

It is accordingly the broad object of the present invention to provide improved methods and means for making black-white decisions in the generation of amplitude quantized and time quantized facsimile signals.

This is accomplished by adopting the rule that if the facsimile signal was transmitted as black during the previous clock interval, the next interval will be transmitted as white if the input video signal is white at any time during this interval, and vice versa.

The invention can be better understood in connection with the drawing wherein FIG. 1 is a schematic representation of a facsimile transmitter.

A facsimile scanner 10 generates a video signal representing the variations in optical density of a successive small area across a document. The signal from scanner 10 is supplied to a squaring circuit 11 to generate a two-level video signal, i.e., one that is quantized in amplitude but not yet quantized in time. A Schmitt trigger represents one type of squaring circuit and a high gain amplifier with limiters representing another form. Scanner 10 is also connected to a timing and control circuit 12 which supplies the various conventional control signals required in a facsimile transmitter, not all of which are illustrated in the drawing. The timing and control circuit will either control the operating speed of the scanner or else the scanner may control the speed of the control circuit. The unsynchronized video output from squaring circuit 11, which illustratively has voltage levels of zero and −12 volts, is connected to control diode SR1 which is in turn connected to an input 13 of a flip flop circuit 14. The output of squaring circuit 11 is also connected to the input of inverter Q1, the output of which is connected through control diode SR4 to the opposite input 15 of flip flop 14. Each input of flip flop 14 is fed through three diodes. If each of diodes SR1, SR2 and SR3, connected to input 13, are returned to −12 volts, then flip flop 14 will switch to the state in which output 16 is zero and output 17 is −12 volts. This can be termed the "black" state. If one or more of these diodes is returned to zero, then none can have any effect on the operation of the flip flop. Similar conditions obtain at input 15. The circuit also includes a second flip flop 22 having outputs 18 and 19 which are connected to diodes SR2 and SR5, respectively, of flip flop 14.

Timing and control circuit 12 also produces a clock signal which is illustratively a square wave having a frequency determined by the transmission link to which the facsimile transmitter is to be connected. The link forms no part of this invention, but the clock frequency may illustratively vary between about 2,000 cycles for use with an ordinary telephone line to about 100 times that frequency for use with a wide band microwave channel. The square wave illustratively has voltage levels of zero and −12 volts and is applied to a transistor amplifier Q2 which is capacitively coupled to a transistor amplifier Q3. Transistor Q3 is normally biased on and the coupling constants are chosen so that the amplified clock signal is able to turn Q3 off for a period of only about 1 microsecond. Accordingly, the output of transistor Q3 is a series of 1 microsecond negative-going pulses having the same repetition rate as the clock frequency. The output of transistor Q3 is coupled to transistor Q4 which inverts and further squares the pulses to produce a train of 1 microsecond positive-going pulses which are applied to diodes SR3 and SR6 associated with inputs 13 and 15, respectively, of flip flop 14. These pulses are also applied to transistor Q5 which again inverts the pulses to form a train of negative pulses which are applied, with the aid of emitter follower Q6, to the inputs of flip flop 22 in a manner which will be described.

The output 16 of flip flop 14 is connected to the input 23 of flip flop 22 through resistor R1 and diode SR7. Resistor R1 is preferably in parallel with a diode SR9, as shown. Similarly, output 17 of flip flop 14 is connected to input 24 of flip flop 22 through resistor R2, diode SR8 and, preferably, diode SR10. Inputs 23 and 24 of flip flop 22 are also coupled, via diode SR7-capacitor C1 and diode SR8-capacitor C2 respectively, to the one microsecond negative clock pulses provided by Q5 and Q6.

Accordingly, a negative voltage on terminals 16 or 17 of flip flop 14 will not affect flip flop 22 because of the blocking action of diodes SR7 and SR8. A nominally zero voltage level on terminals 16 or 17 is not sufficiently positive to affect flip flop 22. However, the positive-going trailing edge of the clock pulse from Q5 and Q6 applied through capacitor C1 will cause flip flop 22 to assume the "black" state wherein output 18 is at zero and output 19 is at −12 volts, if output 16 of flip flop 14 is at zero volts and has been at zero volts at least long enough before the end of the clock pulse to charge up capacitor C1. This required lead time is only on the order of a microsecond. Similar conditions apply for signals applied to input 24 through capacitor C2 and resistor R2.

Having described the operation of the individual elements in FIG. 1, it is possible to see how they function as a whole. Assume initially that flip flop 22 is in the "white" state wherein output 18 is at −12 volts and output 19 is at zero. Since output 19 is connected to diode SR5, it is apparent that video signal applied to diode SR4 can have no effect on flip flop 14. However, since diodes SR2 and SR3 are now returned to −12 volts, it is apparent that the first appearance of a −12 volt video signal at diode SR1 will cause flip flop 14 to switch to the "black" state wherein output 16 is at zero and output 17 is at −12 volts. If flip flop 14 was previously in that state, it will remain so. The end of the decision making interval is determined by the arrival of a positive-going clock pulse at diodes SR3 and SR6. In particular, the pulse on SR3 disables flip flop 14. At the same time, negative clock pulses are applied to capacitors C1 and C2 associated with flip flop 22. If flip flop 14 has switched to the "black" state wherein output 16 is at zero volts, then flip flop 22 is enabled to switch to the "black" state wherein output 19 is at −12 volts. If flip flop 14 has remained in the "white" state wherein output 17 is at zero volts, then flip flop 22 will not alter its own state. At the end of the clock pulse the circuit is free to make decisions again. If flip flop 22 has not switched to "black," it will remain in the same state until such time as a video signal level of −12 volts appears at the output of squaring circuit 11 and at diode SR1. If, however, flip flop 22 has switched to the "black" state wherein output 19 is at −12 volts and output 18 is at zero volts, then diode SR2 will inhibit the effect of video signals applied to input 13 of flip flop 14 through diode SR1. Whenever a video signal of −12 volts appears at diode SR4, flip flop 14 will switch back to the "white" state wherein output 17 is at zero volts. Because of inverter Q1, a −12 volt signal at diode SR4 corresponds to a zero volt level from squaring circuit 11.

Ordinarily, the two voltage levels generated by squaring circuit 11 correspond to black and white areas of the document and similarly, the two voltage levels appearing at output 18 of flip flop 22 will correspond to black and white. By using conventional digital data processing terminology, and referring to the output signal level between sync pulses as a "bit," the operation of the circuit of FIG. 1 between squaring circuit 11 and output terminal 18 can be summarized as follows: If the previous bit was judged black, this bit will be judged white if the video signal is white at any time during this bit, and vice versa.

It is also obvious that the voltage appearing at terminal 18 has been time quantized, since transitions can occur in flip flop 22 only when enabled by the periodic clock pulses. Output terminal 18 is connected to one input of a dual input OR gate 20 which is also connected to timing and control circuit 12. OR circuit 20 is used to add suitable synchronizing and control words to the output signal during retrace intervals or other periods when no video is present. The combined signal appears at output terminal 21 and represents a complete facsimile signal suitable for transmission to a remote receiving location.

The above circuit tends to maximize the number of transitions in the time quantized signal, and this is a particularly desirable feature of the invention. The process of clocking or time quantizing the video signal from squaring circuit 11 inevitably tends to reduce the information content of the signal. In accordance with the invention, however, this loss of information is minimized. In particular, if the unclocked video contains many frequent transitions, according at a rate greater than the clock frequency, the clocked output signal will consist of an alternation of black and white bits. This is preferable to transmitting all white bits, all black bits, or some unpredictable combination thereof.

The above circuit is sensitive to transitions in the output of squaring circuit 11 at all times except during the short clock pulses. The short dead time represented by the clock pulses is ordinarily a small fraction of a clock cycle and has no effect on the operation of the invention. This is particularly true if the clock pulses are short compared to the response time of scanner 10 and squaring circuit 11. In this case, there is no possibility of overlooking a transition in the output of circuit 11. The clock pulses can be made arbitrarily small by using higher speed pulse generators and faster flip flops as are known in the data processing art. Similarly, the clock pulses can be made longer, thereby increasing the dead time of the circuit. This may be desirable in some situations, depending upon the type of document being transmitted and the type of facsimile equipment being used.

Sometimes it is desirable to modify the action of the circuit of FIG. 1 to reduce its sensitivity to very small back or white areas. One way of accomplishing this is shown in FIG. 2, which shows a modified form of logic for use at input 13 of flip flop 14. The circuit differs from that of FIG. 1 primarily by the addition of capacitor C3 to terminal 13. Simultaneous application of negative voltage to diodes SR1, SR2 and SR3 can no longer cause an instantaneous change in the state of flip flop 14, because capacitor C3 must be charged up and prevents the voltage on terminal 13 from changing rapidly. Thus, flip flop 14 cannot change state until a certain time, controllable by varying C3, after negative voltage is simultaneously applied to SR1, SR2 and SR3. Substitution of Zener diode SR11 for the corresponding resistor of FIG. 1 is desirable in order to provide a constant and predictable time delay.

If the illustrated modification is also applied at input 15, then the circuit will perform in accordance with the following modified decision-making rule: If the previous bit was judged black, this bit will be judged white if the video signal is white for a predetermined percentage of this bit, and vice versa.

It is, however, not always desirable to apply the illustrated modification equally to both inputs of flip flop 14. By using different values of capacitance at each terminal, the percentage of "black" required to cause a white-black transition can be made different from the percentage of "white" required to cause a black-white transition. In particular, by applying the modification to only one input terminal of flip flop 14, it is possible to implement a decision-making rule of the following desirable type: If the previous bit was judged black, this bit will be judged white if the video signal is white for a predetermined percentage of this bit; but if the previous bit was judged white, this bit will be judged black if the video signal is black at any time during this bit.

The specific described embodiments of the invention were shown for illustrative purposes only. Many equivalents are known for the various elements of the circuits and may be used in accordance with the invention. In particular, the elements of the circuits perform known logical functions, although the circuits were not described in such terms. By way of example, diodes SR1, SR2 and SR3 perform the function of a NAND gate. Thus, other circuitry may be substituted to perform the logical functions inherent in the figure. It will also be appreciated that the signal obtained at terminal 21 can be recorded on a tape recorder or the like for later replay as well as be directly transmitted for immediate recreation at a remote location. Although described solely in terms of a facsimile system, it is apparent that the invention may be employed with digital television systems or with any other system in which it is desired to time quantize a signal with minimum loss of information content.

Accordingly, there is no intention to limit the invention to specific embodiments or specific purposes, except in accordance with the claims. Reference to signal levels in the claims is not intended to denote any particular voltages, since voltage levels may vary between embodiments or even between different parts of a circuit. In fact, levels such as "black" and "white" can be represented by signal attributes other than voltage. Reference to signal levels is instead intended to denote signal attributes corresponding to one or the other of two distinct values or symbols such as "0 and 1" or "black and white."

What is claimed is:

1. The method of generating a synchronous two-level signal from an asynchronous two-level signal and a series of clock signals defining clock intervals therebetween comprising:
- comparing said synchronous and asynchronous signals during each clock interval,
- maintaining said synchronous signal at one of two levels during each said clock interval,
- and changing the synchronous signal to the other of said two levels at a clock signal if said synchronous and asynchronous signals differed during the preceding clock interval.

2. The method of generating a synchronous two-level signal from an asynchronous two-level signal and a series of clock signals defining clock intervals therebetween comprising:
- comparing said synchronous and asychronous signals during each clock interval,
- maintaining said synchronous signal at one of two levels during each said clock interval,
- and changing the synchronous signal to the other of said two levels at a clock signal if said synchronous and asynchronous signals differed during a predetermined portion of the preceding clock interval.

3. A video synchronizing circuit for generating a synchronous two-level signal from an asynchronous two-level signal and a series of clock pulses comprising:
- a first bistable circuit,
- a second bistable circuit,
  - said first bistable circuit being adapted to be disabled by said clock signals, adapted to be switched in response to the level of said asynchronous signal, and connected to said second bistable circuit whereby it is prevented from switching to the state of said second bistable circuit,
  - said second bistable circuit being adapted to be enabled by said clock signals, and connected to said first bistable circuit whereby it is switched to the state of said first bistable circuit only when enabled by said clock signals,
- and means connected to said second bistable circuit to derive therefrom a two-level signal corresponding to the state of said bistable circuit.

4. A facsimile transmitter comprising:
- a scanner for generating a video signal corresponding to an original subject,
- limiting means associated with said scanner to limit said signals to two values,
- a clock to generate a sequence of clock signals,
- a first bistable circuit,
- a second bistable circuit,
  - said first bistable circuit being connected to said limiting means and adapted to be switched in response to the value of the signal therefrom, connected to said clock and adapted to be disabled by said clock signals, and connected to said second bistable circuit whereby it is prevented from switching to the state of second bistable circuit, said second bistable circuit being connected to said clock and adapted to be enabled by said clock signals, and connected to said first bistable circuit whereby it is switched to the state of said first bistable circuit only when enabled by said clock signals, and means connected to said second bistable circuit to derive therefrom a two-level signal corresponding to the state of said bistable circuit and constituting a facsimile signal for transmission.

References Cited

UNITED STATES PATENTS 3,273,141 9/1966 Hackett -------------- 340—347

ROBERT L. GRIFFIN, *Primary Examiner.*

R. L. RICHARDSON, *Assistant Examiner.*